K. KEELER.
AUTOMATIC HEAD GATE.
APPLICATION FILED DEC. 29, 1913.
1,138,485. Patented May 4, 1915.
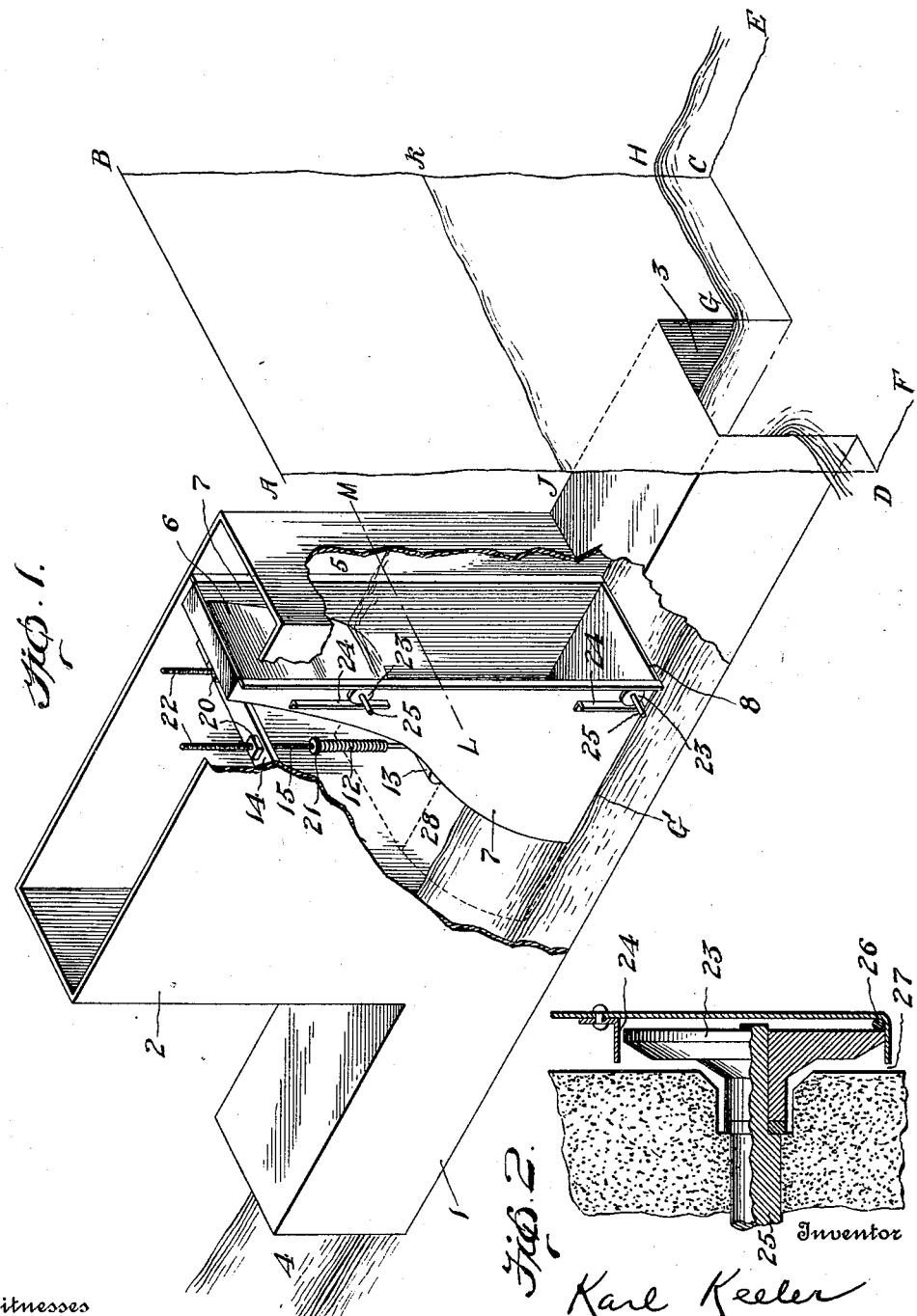

UNITED STATES PATENT OFFICE.

KARL KEELER, OF PROVO, UTAH.

AUTOMATIC HEAD-GATE.

1,138,485.   Specification of Letters Patent.   Patented May 4, 1915.

Application filed December 29, 1913. Serial No. 809,345.

*To all whom it may concern:*

Be it known that I, KARL KEELER, a citizen of the United States, residing at Provo, county of Utah, and State of Utah, have invented certain new and useful Improvements in Automatic Head-Gates, of which the following is a specification.

This invention relates to automatic head gates.

The present invention has for its object the provision of an automatically acting head gate of improved construction adapted for regulating the flow of liquid from a vat or other vessel, or the flow of water from a reservoir, river, canal or waterway, or the flow of water or other liquid from any source whatsoever in which the surface of the water or other liquid is caused to rise or fall.

My invention contemplates the provision of automatically acting head gates which will be adapted to meet any of the following conditions of regulation, separately, either allow the passage of a constant flow, or the passage of a certain proportion of a stream, or the passage of a constant flow until the surface level of the source rises above a predetermined level then a proportion of the increase above that level, or the passage of a proportion of a stream as long as the surface level of the stream remains below a predetermined level and the passage of a constant flow when the surface is above this level, or any other regulation in which the flow passing through the head gate is dependent upon the surface level of the source from which the flow is drawn, the shape of the gate being changed somewhat to meet the conditions imposed upon it, but in all instances it is adapted to utilize the weight and pressure of the water to automatically determine the amount or volume of flow which may pass the gate.

The invention consists of a head gate constructed to sustain the pressure and weight of the liquid, as will more fully appear hereinafter, and mounted to rise by virtue of, and fall in opposition to, the action of springs. The number or strength or capacity of these springs may be adjusted to suit the conditions of flow desired to be fulfilled.

In the accompanying drawings: Figure 1 is a perspective view, broken away, showing a conduit and the present head gate for regulating the flow through said conduit; Fig. 2 is a detail of the side rollers.

The conduit 1 may be of concrete, lumber, or other suitable material, provided with an upwardly extending gate box 2. The liquid enters at 3 and the proper amount, as regulated by the gate, emerges at 4.

The head gate of the present invention is shown at 5, the same being of some non-corrosive metal or material which will not be damaged by the action of the liquid. This gate has a curved breast 6, side walls 7 flanking the breast, and a bottom 8. The breast with the bottom 8 and walls 7, forms a receptacle to receive the pressure or head and weight of the liquid entering through 3 and rising in the gate box 2, such pressure and weight of liquid being sustained by the bottom 8 and the breast 6. According to the rise and fall of the gate 5, the quantity of flow beneath the bottom 8 is regulated, which in turn is controlled by the pressure and weight acting on the breast 6 and bottom 8. This pressure or head in turn depends on the surface level of the liquid in the gate box, which level is the same as that in the source. To provide for regulation or setting of the gate according to the desired flow to be allowed beneath the bottom 8, there are provided suspending coil springs 12 which may be connected to any part of the gate 5, but are preferably fastened to a cross bar 13. The springs are connected to cross-bar 14. Either the cross-bar 14 or the connectors 15 which attach the springs to the cross-bar 14, may be adjustable.

22 are threaded suspension rods, being threaded throughout their entire length. 20 are adjusting nuts and 21 are adjusting nuts which are set in the head of the springs. Cross-bar 14 can also be adjusted, *i. e.*, raised or lowered.

The principle upon which the invention works is as follows: Suppose the plane A. B. C. D. to be the side and the planes C. D. E. F. to be the bottom of a vat, reservoir, river, canal or water way (see drawing, Fig. 1), hereinafter called the source containing a liquid in which the surface level of the liquid is caused to rise and fall and suppose it was desired to take from this source a regulated stream, for example, say, a constant stream of one second foot. Now, by the proper adjustment of the suspending springs, the head gate is raised to such a height above the bottom of the conduit that the desired amount one second foot will just flow under the gate when the surface level in the source is just level with the bottom of the gate, i. e., referring to Fig. 1, suppose the surface level in the source to be at G, H, then in the conduit it would be at G' that is just level with the bottom of the gate but flowing freely under the same and flowing on through the conduit and flowing freely away from the conduit. Now suppose the surface level of the source to rise, say to level J. K., then the surface level in the gate box would rise to the same height L. M. and the flow under the gate would increase due to the increased head if the gate did not lower to such a point that the flow under it was maintained constant. Now as the surface level of the source rises above the level of the bottom of the gate the liquid runs into the receptacle formed by the bottom, sides and breast of the gate and increase the weight to be sustained by the suspending springs and accordingly the springs elongate, which elongation allows the gate to lower and the lowering of the gate maintains the constant flow under it. Now as the surface level of the source rises the height of the liquid in the receptacle in the gate rises and accordingly the weight imposed on the suspending springs increases and the gate is accordingly caused to lower and the flow is in this way maintained constant. Again—as the surface level of the source lowers, the weight in the gate is decreased and the springs cause the gate to rise so that the flow under the gate is kept constant whether the surface level of the source rises or lowers.

I do not limit myself to the exact shape of the breast 6 as shown in Fig. 1.

The function of the rollers 23 is to keep the gate from being pushed back by the pressure of the liquid in front of it and are to be made of any suitable material. I speak of front or forward as toward the intake end of the conduit and back or behind as toward the outlet end of the conduit. The extending shafts or spindles 25 are to be anchored in or fastened to the sides of the conduit in such a way that the rollers 23 will turn freely on them and are to be made of any suitable material. There are two corresponding rollers on each side of the gate. Fig. 2 shows a detail of the rollers. The function of the angle strips shown at 24 is to keep the gate from being pushed forward by any cause whatsoever. 26, Fig. 2, is a wire or other suitable strip to prevent the gate from crowding over against either side of the conduit or gate box and thus cause undue rubbing. It will be noticed that at 27, Fig. 2, a space is left between the turned edge of the side and the conduit or gate box. This space is left to eliminate any side rubbing and the leakage through this opening at the various levels of the liquid is compensated for by the amount the gate lowers or rises and hence a definite regulation is maintained. I may use a removable airtight float 28 of sheet metal or some suitable material filled with air attached to the back of the gate, its function being that in case the liquid is obstructed in its flow from the conduit and is caused to back up in the conduit until its surface in the conduit behind the gate rises above the bottom of the gate, the float will, by its buoyancy cause the gate to rise an amount sufficient to keep the flow properly regulated, that is, if the water backs up behind the gate and thus decreases the effective head and accordingly decreases the flow under the gate, the float 28 will, by its buoyancy, raise the gate to such a height that the proper flow under the gate will be maintained. This float 28 is not necessary to the successful operation of the invention and is usually dispensed with.

Having thus described my invention, what I claim as new and desire to secure by Letters Patent, is:

1. The combination with a fluid conduit, of spring suspending means, and an upwardly and downwardly bodily movable head gate having a laterally disposed bottom and an upright breast, said headgate being freely suspended by said spring suspending means, directly subject to the pressure and head of the fluid adapted to regulate the flow thereof beneath the gate.

2. The combination with a fluid conduit, of a tension suspended upwardly and downwardly movable head gate having an open part composed of a breast and bottom and sides adapted to receive the pressure and head of the water and to regulate the flow of the fluid through said conduit and past said headgate.

3. The combination with a fluid conduit, of spring suspending means, embodying an adjustable tension device, and an upwardly and downwardly bodily movable head gate having a laterally disposed bottom and an upright breast, said headgate being freely suspended by said spring suspending means, directly subject to the pressure and head of the fluid and adapted to regulate the flow thereof beneath the gate.

4. The combination with a fluid conduit, of an automatic headgate of hollow form composed of breast, sides and bottom adapted to receive the pressure and head of the liquid, retaining rollers coöperating with the head gate and adapted to prevent its horizontal displacement, and spring suspension means for said head gate said headgate being adapted to regulate the flow of the fluid through said conduit and past said headgate.

5. The combination with a fluid conduit, of a tension suspended upwardly and downwardly movable head gate having an open part composed of a breast and bottom and sides adapted to receive the pressure and head of the water, said headgate being adapted to regulate the flow of the fluid through said conduit and past said headgate, and a float coöperating with the headgate and adapted to compensate for backing up of the fluid.

In testimony whereof, I hereunto affix my signature in presence of two witnesses.

KARL KEELER.

Witnesses:
C. E. BARTHELL,
THOMAS BIDDLE.

Copies of this patent may be obtained for five cents each, by addressing the "Commissioner of Patents, Washington, D. C."